(12) United States Patent
Lee et al.

(10) Patent No.: US 8,564,594 B2
(45) Date of Patent: Oct. 22, 2013

(54) SIMILAR SHADER SEARCH APPARATUS AND METHOD USING IMAGE FEATURE EXTRACTION

(75) Inventors: Jae-Ho Lee, Daejeon (KR); Hee-Kwon Kim, Seoul (KR); Seung-Woo Nam, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 759 days.

(21) Appl. No.: 12/784,437

(22) Filed: May 20, 2010

(65) Prior Publication Data

US 2011/0142336 A1 Jun. 16, 2011

(30) Foreign Application Priority Data

Dec. 10, 2009 (KR) .................. 10-2009-0122735

(51) Int. Cl.
*G06T 15/50* (2011.01)
(52) U.S. Cl.
USPC ........... 345/426; 345/440; 345/581; 345/582; 345/589; 382/164; 382/165; 382/181
(58) Field of Classification Search
USPC .......... 345/426, 440, 582, 581, 589; 382/164, 382/165, 181
See application file for complete search history.

(56) References Cited

U.S. PATENT DOCUMENTS

| | | | |
|---|---|---|---|
| 6,606,092 B2 | 8/2003 | Driemeyer et al. | |
| 8,189,002 B1 * | 5/2012 | Westerhoff et al. | 345/426 |
| 2005/0105776 A1 * | 5/2005 | Luo et al. | 382/115 |
| 2006/0082577 A1 | 4/2006 | Carter | |
| 2006/0098019 A1 | 5/2006 | Tarditi, Jr. et al. | |
| 2008/0094409 A1 * | 4/2008 | Koguchi et al. | 345/582 |
| 2009/0219281 A1 * | 9/2009 | Maillot | 345/419 |
| 2010/0119163 A1 * | 5/2010 | Inoue | 382/224 |
| 2010/0141653 A1 | 6/2010 | Lee et al. | |
| 2011/0085739 A1 * | 4/2011 | Zhang et al. | 382/218 |

FOREIGN PATENT DOCUMENTS

| | | |
|---|---|---|
| KR | 10-2008-0050299 A | 6/2008 |
| KR | 10-2009-0002362 A | 1/2009 |
| KR | 10-2009-0021809 A | 3/2009 |
| WO | WO 2008/066292 | 6/2008 |

OTHER PUBLICATIONS

Hee-Kwon Kim et al., "Efficient Shading System Based on Similar Shader Retrieval", Sep. 26, 2009.
Hee-Kwon Kim et al., "Similar Shader Search System Using Image Retrieval", Oct. 10, 2009.

* cited by examiner

*Primary Examiner* — Xiao M. Wu
*Assistant Examiner* — Todd Buttram
(74) *Attorney, Agent, or Firm* — Blakely Sokoloff Taylor & Zafman

(57) ABSTRACT

A similar shader search apparatus using image feature extraction includes: an image extraction unit configured to classify color, texture, pattern features of a 2D image, into a color feature set, a texture feature set, and a pattern feature set, numerically analyze the respective feature sets, and extract a feature value of the image; a shader extraction unit configured to analyze a predetermined stored shader, classify features having an effect upon color, texture, and pattern into a color feature set, a texture feature set, and a pattern feature set, numerically analyze the respective feature sets, and extract a feature value of the shader; and a distance function calculation unit configured to receive the image feature value and the shader feature value, calculate the similarity of color between the image and the shader, and calculate the similarity of texture between the image and the shader using the Euclidean distance function.

10 Claims, 2 Drawing Sheets

SIMILAR SHADER SEARCH APPARATUS AND METHOD USING IMAGE FEATURE EXTRACTION

CROSS-REFERENCE(S) TO RELATED APPLICATION

The present application claims priority of Korean Patent Application No. 10-2009-0122735, filed on Dec. 10, 2009, which is incorporated herein by reference in its entirety.

BACKGROUND OF THE INVENTION

1. Field of the Invention

Exemplary embodiments of the present invention relate to a similar shader search apparatus and method; and, more particularly, to a similar shader search apparatus and method using image feature extraction.

2. Description of Related Art

In general, rendering refers to the process of adding reality to computer graphics by applying three-dimensional (3D) textures such as shades or changes in color and concentration. Furthermore, 3D rendering refers to the process of creating an image by using 3D geometrical information and external information such as light source, position, and color, based on a 2D image.

Shading refers to an operation of putting colors on 3D data or representing surface features. In order to perform such a shading operation, various attributes such as shape, color, texture, and pattern for 3D graphics data should be precisely understood and applied.

Furthermore, a shader refers to a component which is used for computer graphics to represent various effects such as color, texture, and pattern in a 3D image, excluding shape. The shader serves to add the relation between object and light to the rendering process and may process various effects depending on users' attentions.

In general, several tens of shaders are required to obtain a 3D image for one scene. Furthermore, the respective shaders are configured as nodes connected like a network and are complexly entangled with each other. Therefore, users need to precisely understand a complicated mathematical expression or concept and the relationship between the respective shaders and require much knowledge about methods for processing lighting or distance which is an external environment. Such various necessary conditions request designers, who actually use the shaders, to pay time and effort.

SUMMARY OF THE INVENTION

An embodiment of the present invention is directed to a similar shader search apparatus and method using image feature extraction, which extracts image features, establishes a similarity measure capable of measuring the similarity between image and shader, and derives a distance function between image and shader which are different objects, based on the similarity measure, such that a user may search for a shader similar to a desired image more easily and quickly.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a similar shader search apparatus using image feature extraction includes: an image extraction unit configured to classify color, texture, pattern features of a 2D image, which is to be analyzed, into a color feature set, a texture feature set, and a pattern feature set, numerically analyze the respective feature sets using an image feature extraction formula, and extract a feature value of the image; a shader extraction unit configured to analyze a predetermined stored shader, classify features having an effect upon color, texture, and pattern into a color feature set, a texture feature set, and a pattern feature set, numerically analyze the respective feature sets using a shader feature extraction formula, and extract a feature value of the shader; and a distance function calculation unit configured to receive the image feature value and the shader feature value, calculate the similarity of color between the image and the shader using a vector-based distance function, and calculate the similarity of texture between the image and the shader using the Euclidean distance function.

In accordance with another embodiment of the present invention, a similar shader search method using image feature extraction includes: classifying color, texture, and pattern features of a 2D image, which is to be analyzed, into a pattern feature set, a texture feature set, and a pattern feature set, numerically analyzing the respective feature sets using an image feature extraction formula, and extracting a feature value of the image; analyzing a predetermined stored shader, classifying features having an effect upon color, texture, and pattern into a color feature set, a texture feature set, and a pattern feature set, numerically analyzing the respective feature sets by using a shader feature extraction formula, and extracting a feature value of the shader; and receiving the image feature value and the shader feature value, calculating the similarity of color between the image and the shader using a vector-based distance function, and calculating the similarity of texture between the image and the shader using the Euclidean distance function.

DESCRIPTION OF SPECIFIC EMBODIMENTS

Figure 1:
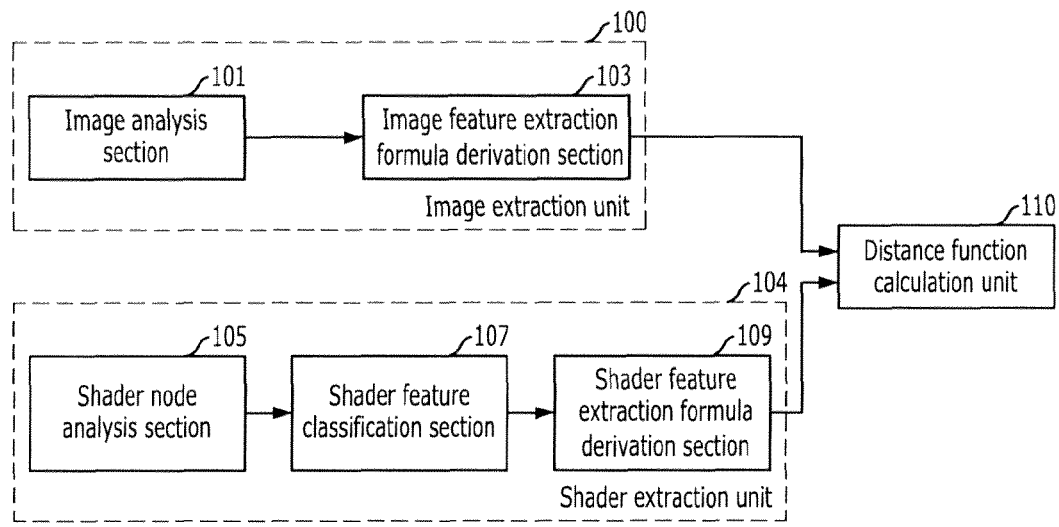
FIG. 1 is a block diagram of a similar shader search apparatus using image feature extraction in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram of a similar shader search apparatus using image feature extraction in accordance with an embodiment of the present invention.

The similar shader search apparatus in accordance with the embodiment, of the present invention may include an image extraction unit 110, a shader extraction unit 104, and a distance function calculation unit 110.

The image extraction unit 110 is configured to analyze the features of an image provided by a user, based on color, texture, and pattern, and extract a color feature set, a texture feature set, and a pattern feature set. In order to extract the features of the image, the image extraction unit 100 may extract the features of the entire image or the features of a specific portion desired by the user. The image extraction unit 100 may include an image analysis section 101 and an image feature extraction formula derivation section 103.

The image analysis section 101 for extracting the features of each image on the basis of color, texture, and pattern is configured to analyze the color, texture, and pattern features of the image. After analyzing the color, texture, and pattern features of the image, the image analysis section 101 provides the analysis result to the image feature extraction formula derivation section 103.

The image feature extraction formula derivation section 103 is configured to analyze the color, texture, and pattern features of the image, which are inputted from the image analysis section 101, and derive an image feature extraction formula. The image feature extraction formula numerically represents the color and texture features, based on a vector function. For example, the image feature extraction formula numerically extracts values of red R, green G, and blue B with respect to the color feature, and numerically extracts gloss, transparency, reflectivity and so on with respect to the texture feature.

The image feature extraction formula derived from the image feature extraction formula derivation section 103 is provided to the distance function calculation unit 110.

The shader extraction unit 104 is configured to extract color, texture, and pattern features for various kinds of predetermined shaders.

The shader refers to a component which is used for computer graphics to represent various effects such as color, texture, and pattern in a 3D image, excluding shape. Several tens of shaders are required to represent one scene as a 3D image. The respective shaders are configured as nodes which are complexly connected to each other like a network.

The shader extraction unit 104 analyzes a node having the shaders connected like a network and derives features having an effect upon color, texture, and pattern to extract a color feature set, a texture feature set, and a pattern feature set. The shader extraction unit 104 includes a shader node analysis section 105, a shader feature classification section 107, and a shader feature extraction formula derivation section 109.

The shader node analysis section 105 for extracting perception features based on the colors and textures of the shaders is configured to analyze a rendering node in which the shaders are connected. The shader node analysis section 105 provides the analysis result for the rendering node to the shader feature classification section 107.

The shader feature classification section 107 is configured to classify the features having an effect upon color, texture, and pattern depending on the analysis result for the rendering node, which is inputted from the shader node analysis section 105. The shader feature classification section 107 provides the classified features having an effect upon color, texture, and pattern to the shader feature extraction formula derivation section 109.

The shader feature extraction formula derivation section 109 is configured to numerically derive a perception feature extraction formula based on a vector function and provide the perception feature extraction formula to the distance function calculation unit 110. The perception feature extraction formula may be used for extracting a color feature set, a texture feature set, and a pattern feature set, which are composed of six-dimensional data including red R, green G, blue B, gloss, transparency, and reflectivity, for each rendering node by reflecting the characteristics and relations of the shader features having an effect upon color and texture, which are inputted from the shader feature classification section 107.

To perform comparison analysis between an image and a shader which are different two objects, a conversion device is needed, which converts bilateral data into a common result value. In the case of the image, the image feature extraction formula derivation section 103 serves as the conversion device. In the case of the shader, the shader feature extraction formula derivation section 109 serves as the conversion device.

The distance function calculation unit 110 is configured to calculate the similarity of color between the image and the shader using a vector-based distance function, based on the feature extraction formula inputted from the shader feature extraction formula derivation section 109 and the image feature extraction formula inputted from the image feature extraction formula derivation section 103. The similarity of texture between the image and the shader is calculated by the Euclidean distance function, and a shader in which the Euclidean distance is minimized is searched for.

Therefore, the similar shader search apparatus in accordance with the embodiment of the present invention establishes a similarity measure capable of measuring the similarity between image and shader to perform the shader search, and provides a distance function between image and shader based on the established similarity measure. Furthermore, the similar shader search apparatus in accordance with the embodiment of the present invention extracts the features of an image desired by a user, in order to precisely search for a shader similar to the image. Therefore, a similarity between two different objects may be determined to extract a common feature between the two objects such that the two objects are compared and analyzed.

That is, the similar shader search apparatus in accordance with the embodiment of the present invention extracts the similarity between 2D image and 3D shader, establishes the similarity measure, and provides the distance function between image and shader by using the established similarity measure. Therefore, the similar shader search apparatus may search for shaders stored in a shader database through the color, texture, and pattern features. The shader database will be described below with reference to FIG. 4.

Next, an image perception feature extraction method and a shader perception feature extraction method in accordance with another embodiment of the present invention will be described.

Figure 2:
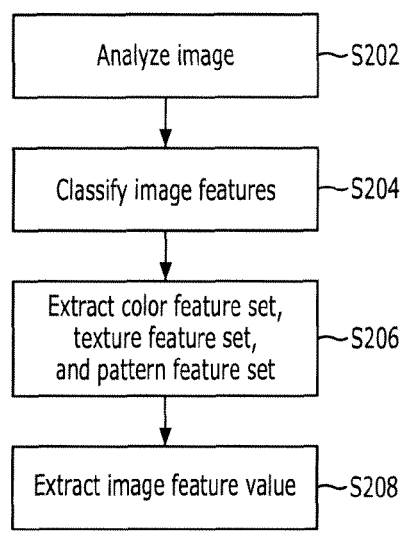
FIG. 2 is a flow chart sequentially showing an image perception feature extraction method in accordance with another embodiment of the present invention.

FIG. 2 is a flow chart sequentially showing the image perception feature extraction method in accordance with the embodiment of the present invention.

In a step S202, the image analysis section 101 analyzes color and texture features of each image, in order extract the features of the image based on color and texture. In a step S204, the image analysis section 101 classifies the analyzed features depending on the color and texture features.

In a step S206, the image analysis section 101 extracts a color feature set, a texture feature set, and a pattern feature set from the classified color and texture features.

In a step S208, the image feature extraction formula derivation section 103 analyzes the respective feature sets inputted from the image analysis section 101 and derives an image feature extraction formula to numerically extract the color and texture features of the image. The image feature extraction formula may be extracted to convert bilateral data into a common numerical result value, in order to perform the comparison analysis between image and shader which are two different objects.

Figure 3:
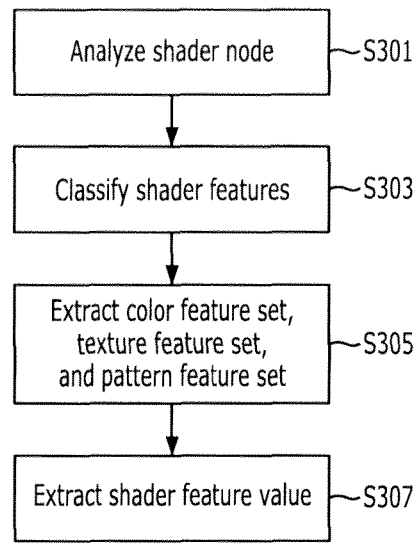
FIG. 3 is a flow chart sequentially showing a shader perception feature extraction method in accordance with the embodiment of the present invention.

FIG. 3 is a flow chart sequentially showing the shader perception feature extraction method in accordance with the embodiment of the present invention.

In a step S301, the shader node analysis section 105 analyzes various kinds of predetermined shaders and shader nodes which are complexly connected like a network, and then provides the analysis results for the respective rendering nodes to the shader feature classification section 107.

In a step S303, the shader feature classification section 107 classifies the features of the shaders having an effect upon color and texture, depending on the analysis results for the respective rendering nodes which are inputted from the shader node analysis section 105. The classified features having an effect upon color and texture are provided to the shader feature extraction formula derivation section 109.

In a step S305, the shader feature extraction formula derivation section 109 numerically extracts a color feature set and a texture feature set for each of the rendering nodes, by using a perception feature extraction formula derived by reflecting the features having an effect upon color and texture which are inputted from the shader feature classification section 107. The perception feature extraction formula reflects the features of the respective shader nodes, because the perception feature extraction formula is derived by considering the features which are complexly connected between the respective shader nodes and the relation between the respective features.

Figure 4:
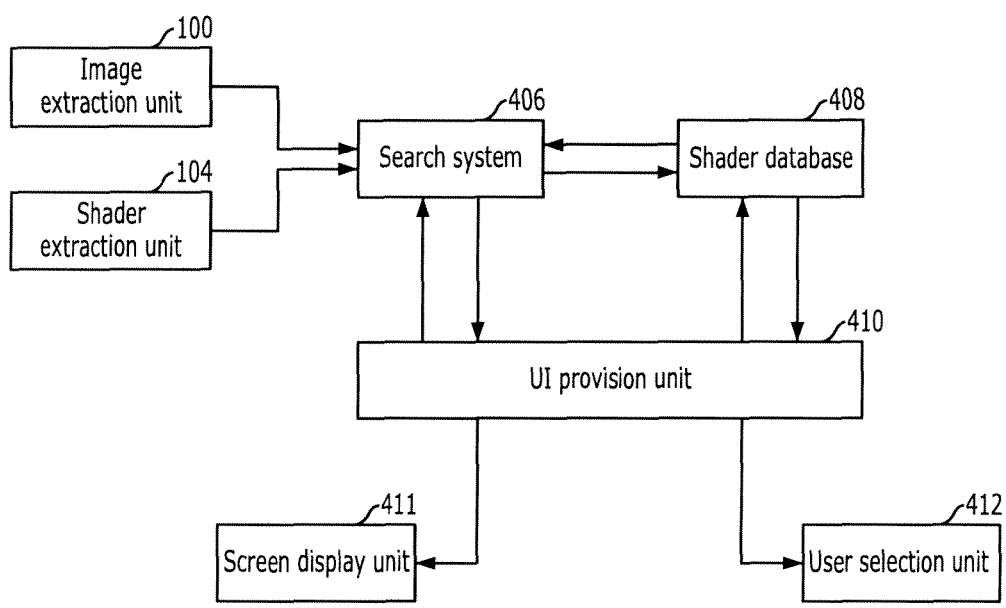
FIG. 4 is a system block diagram of a similar shader search apparatus using image feature extraction in accordance with another embodiment of the present invention.

FIG. 4 is a system block diagram of a similar shader search apparatus using image feature extraction in accordance with another embodiment of the present invention.

The image extraction unit 100 and the shader extraction unit 104 apply different processing methods depending on the form of an object provided by a user.

The image extraction unit 100 extracts features using the image perception feature extraction method and provides the extracted features to a search system 406.

The shader extraction unit 104 extracts features using the shader feature perception extraction method and provides the extracted features to the search system 406.

The search system 406 provides a query to the shader database 408 using the features provided by the image extraction unit 100 or the shader extraction unit 104.

The shader database 408 receives the query provided by the search system 406 and provides shader data stored therein to the search system 406.

The search system 406 compares the shader data provided by the shader database 408 with the data provided by the image extraction unit 100 or the shader extraction unit 104, extracts a shader having the minimum value by using the Euclidean distance function, and provides the extracted shader to a user interface (UI) provision unit 410.

The UI provision unit 410 displays shaders provided by searching the shader database 408 on a search window of a screen display unit 411 such as monitor or LCD.

A user selection unit 412 includes a mouse or keyboard through which a user selects a desired shader among the shaders provided by the screen display unit 411. The UI provision unit 410 provides a query for the shader selected by the user to the shader database 408.

The shader database 408 searches for a shader corresponding to the query provided by the UI provision unit 410, and the screen display unit 411 displays the shader data provided by the shader database 408 on the search window thereof. Then, the user may finally select the desired shader, while seeing the searched-for shader results.

In this embodiment of the present invention, a shader or image desired by a user is used to search the shader database. Therefore, since the most similar data to the shader or image desired by the user is searched for, it is possible to reduce the time and cost required when generating or correcting a shader.

Furthermore, since the similar shader search is performed using the image extraction, users may have access to the shaders more effectively, and graphic rendering may be supported more effectively. Furthermore, several shader search results may be compared and analyzed only through a simple manipulation, although users do not perceive options and factors of the shaders. Therefore, it is possible to increase the efficiency of shader development and the convenience of the users and to reduce the operation time. Furthermore, when another apparatus or program applies a shader, automatic conversion is performed depending on the state of the rendering result, and an image desired by a user is used to perform the shader search. Therefore, it is possible to carry out the development of shaders more easily and quickly.

While the present invention has been described with respect to the specific embodiments, it will be apparent to those skilled in the art that various changes and modifications may be made without departing from the spirit and scope of the invention as defined in the following claims.

What is claimed is:

1. A similar shader search apparatus using image feature extraction, comprising:
    an image extraction unit configured to classify color, texture, pattern features of a 2D image, which is to be analyzed, into a color feature set, a texture feature set, and a pattern feature set, numerically analyze the respective feature sets using an image feature extraction formula, and extract a feature value of the image;
    a shader extraction unit configured to analyze a rendering node in which shaders are connected to each other, in order to extract perception features of color texture and pattern from a predetermined stored shader, classify features having an effect upon color, texture, and pattern into a color feature set, a texture feature set, and a pattern feature set depending on the analysis result, numerically derive the classified feature sets using a shader feature extraction formula, and extract a feature value of the shader; and
    a distance function calculation unit configured to receive the image feature value and the shader feature value, calculate the similarity of color between the image and the shader using a vector-based distance function, and calculate the similarity of texture between the image and the shader using the Euclidean distance function.

2. The similar shader search apparatus of claim 1, wherein the image extraction unit comprises:
    an image analysis section configured to analyze the features of the image depending on color, texture, and pattern, in order to extract the features of the image; and
    an image feature extraction formula derivation section configured to classify the analyzed color, texture, and pattern features into the color feature set, the texture feature set, and the pattern feature set, numerically analyze the respective feature sets by using the image feature extraction formula, and extract the feature value of the image.

3. The similar shader search apparatus of claim 1, wherein the shader extraction unit comprises:

a shader node analysis section configured to analyze the rendering node;

a shader feature classification section configured to classify the features having an effect upon color, texture, and pattern into the color feature set, the texture feature set, and the pattern feature set, depending on the analysis result; and a shader feature extraction formula derivation section configured to numerically derive the classified feature sets.

4. The similar shader search apparatus of claim 1, wherein the shader feature extraction formula derivation section numerically derives the classified feature sets using a perception feature extraction formula.

5. A similar shader search apparatus using image feature extraction, comprising:

an image extraction unit configured to classify color, texture, pattern features of a 2D image, which is to be analyzed, into a color feature set, a texture feature set, and a pattern feature set, numerically analyze the respective feature sets using an image feature extraction formula, and extract a feature value of the image;

a shader extraction unit configured to analyze a rendering node in which shaders are connected to each other, in order to extract perception features of color, texture, and pattern from a predetermined stored shader, classify features having an effect upon color, texture, and pattern into a color feature set, a texture feature set, and a pattern feature set depending on the analysis result, numerically derive the classified feature sets using a shader feature extraction formula, and extract a feature value of the shader;

a search system configured to provide a query to a shader database using the feature value provided by the image extraction unit or the shader extraction unit, compare the provided feature value with shader data provided from the shader database by using the Euclidean distance function, and extract a shader having the minimum value;

a user interface (UI) provision unit configured to provide the search result of the shader database in the search system; and a user selection unit configured to receive selection information of a user and provide a selection signal to the UI provision unit.

6. The similar shader search apparatus of claim 5, further comprising a screen display unit configured to display the search result on a screen.

7. A similar shader search method using image feature extraction, comprising:

classifying by a processor color, texture, and pattern features of a 2D image, which is to be analyzed, into a pattern feature set, a texture feature set, and a pattern feature set, numerically analyzing the respective feature sets using an image feature extraction formula, and extracting a feature value of the image;

analyzing a rendering node in which shaders are connected to each other, in order to extract perception features of color, texture, and pattern from a predetermined stored shader, classifying features having an effect upon color, texture, and pattern into a color feature set, a texture feature set, and a pattern feature set depending on the analysis result, numerically deriving the classified feature sets by using a shader feature extraction formula, and extracting a feature value of the shader; and receiving the image feature value and the shader feature value, calculating the similarity of color between the image and the shader using a vector-based distance function, and calculating the similarity of texture between the image and the shader using the Euclidean distance function.

8. The similar shader search method of claim 7, wherein said classifying color, texture, and pattern features of a 2D image, which is to be analyzed, into a pattern feature set, a texture feature set, and a pattern feature set, numerically analyzing the respective feature sets using an image feature extraction formula, and extracting a feature value of the image comprises:

analyzing the features of the image depending on color, texture, and pattern; and classifying the analyzed color, texture, and pattern features into the pattern feature set, the texture feature set, and the pattern feature set, numerically analyzing the respective feature sets using the image feature extraction formula, and extracting the feature value of the image.

9. The similar shader search method of claim 7, wherein said analyzing a predetermined stored shader, classifying features having an effect upon color, texture, and pattern into a color feature set, a texture feature set, and pattern feature set, numerically analyzing the respective feature sets by using a shader feature extraction formula, and extracting a feature value of the shader comprises: analyzing a rendering node in which shaders are connected to each other, in order to extract perception features of color, texture, and pattern from the predetermined shader; classifying the features having an effect upon color, texture, and pattern into the color feature set, the texture feature set, and the pattern feature set, depending on the analysis result; and numerically deriving the classified feature sets.

10. A similar shader search method using image feature extraction, comprising:

classifying, by a processor, color, texture, and pattern features of a 2D image, which is to be analyzed, into a pattern feature set, a texture feature set, and a pattern feature set, numerically analyzing the respective feature sets using an image feature extraction formula, and extracting a feature value of the image;

analyzing a rendering node in which shaders are connected to each other, in order to extract perception features of color, texture, and pattern from a predetermined stored shader, classifying features having an effect upon color, texture, and pattern into a color feature set, a texture feature set, and a pattern feature set depending on the analysis result, numerically deriving the classified feature sets by using a shader feature extraction formula, and extracting a feature value of the shader;

providing a query to a shader database using the feature the image feature value or the shader feature value, comparing the feature value with shader data provided from the shader database using the Euclidean distance function, and extracting a shader having the minimum value;

providing the search result of the shader database;

displaying the search result on a screen; and selecting a desired shader among the shaders provided on the screen.

* * * * *